(12) United States Patent
Lee et al.

(10) Patent No.: US 8,732,254 B2
(45) Date of Patent: May 20, 2014

(54) SYSTEM, A METHOD, A SERVICE SERVER, A MOBILE TERMINAL AND A STORAGE MEANS FOR CONTENTS DELIVERY

(75) Inventors: Jeong Hoon Lee, Seoul (KR); Jeong Min You, Seoul (KR); In Hwan Kim, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 372 days.

(21) Appl. No.: 13/126,844

(22) PCT Filed: Dec. 4, 2008

(86) PCT No.: PCT/KR2008/007155
§ 371 (c)(1),
(2), (4) Date: Apr. 29, 2011

(87) PCT Pub. No.: WO2010/050642
PCT Pub. Date: May 6, 2010

(65) Prior Publication Data
US 2011/0208825 A1 Aug. 25, 2011

(30) Foreign Application Priority Data
Oct. 31, 2008 (KR) ........................ 10-2008-0107990

(51) Int. Cl.
*G06F 15/16* (2006.01)
(52) U.S. Cl.
USPC .......................... 709/206; 709/205; 709/202
(58) Field of Classification Search
USPC ......... 709/201–206, 208, 209, 212, 213, 217, 709/227–232, 236, 237; 725/37, 60, 61, 725/105, 115–123, 131–135, 139, 143, 148, 725/151–153; 370/235, 259, 270, 277, 278, 370/282, 310, 312, 328, 329, 338, 432; 455/73, 88, 91, 95, 403, 410–412.2, 455/414.1–414.4, 418–420, 422.1, 456.1, 455/456.2, 457, 550.1

See application file for complete search history.

(56) References Cited

U.S. PATENT DOCUMENTS 7,373,395 B2 * 5/2008 Brailean et al. ............... 709/219
7,386,623 B2 * 6/2008 Nishimura et al. ........... 709/231
8,150,387 B2 * 4/2012 Klein et al. ................... 455/420

(Continued)

FOREIGN PATENT DOCUMENTS

EP 1220133 A1 * 7/2002 ............. G06F 17/60
JP 2001-356996 12/2001

(Continued)

OTHER PUBLICATIONS

Office action from KIPO mailed Dec. 11, 2012 for 10-2008-0107990.

(Continued)

*Primary Examiner* — Hassan Kizou
*Assistant Examiner* — Phyllis Book
(74) *Attorney, Agent, or Firm* — Lowe Hauptman & Ham LLP

(57) ABSTRACT

Disclosed herein are a system and method for transmitting content, a service server, a mobile communication terminal and a storage medium. The system includes an end device connected to a first mobile communication terminal via a local area communication network, and configured to transmit content to be transmitted to a second mobile communication terminal, together with a message transmission request, to the first mobile communication terminal; and the first mobile communication terminal connected to the end device via the local area communication network, connected to a service server via a mobile communication network, and configured to display a message transmission window for inputting a message and a recipient's number on a screen when the message transmission request is received from the end device, and to transmit a Multimedia Message Service message (MMS), to which the content received from the end device is attached, to the second mobile communication terminal.

7 Claims, 5 Drawing Sheets

(56) References Cited

U.S. PATENT DOCUMENTS

| | | | |
|---|---|---|---|
| 8,255,964 B2* | 8/2012 | Brown et al. | 725/110 |
| 8,296,355 B2* | 10/2012 | Kim | 709/203 |
| 2004/0044774 A1* | 3/2004 | Mangalik et al. | 709/227 |
| 2004/0063449 A1 | 4/2004 | Fostick | |
| 2005/0246757 A1* | 11/2005 | Relan et al. | 725/135 |
| 2007/0088838 A1* | 4/2007 | Levkovitz et al. | 709/228 |
| 2007/0177606 A1* | 8/2007 | Jabri et al. | 370/395.5 |
| 2007/0180135 A1* | 8/2007 | Kenrick et al. | 709/231 |
| 2007/0226363 A1* | 9/2007 | Nishizawa et al. | 709/230 |
| 2008/0233930 A1* | 9/2008 | Wurster et al. | 455/414.3 |
| 2008/0307480 A1* | 12/2008 | Chiba et al. | 725/118 |
| 2009/0061925 A1* | 3/2009 | Finkelstein et al. | 455/552.1 |
| 2010/0037274 A1* | 2/2010 | Meuninck et al. | 725/109 |

FOREIGN PATENT DOCUMENTS

| | | |
|---|---|---|
| JP | 2002-23773 | 1/2002 |
| JP | 2002-191077 | 7/2002 |
| JP | 2002-222154 | 8/2002 |
| JP | 2003-125276 | 4/2003 |
| JP | 2003-234936 | 8/2003 |
| JP | 2003-309694 | 10/2003 |
| JP | 2005-151244 | 6/2005 |
| KR | 1020010107905 | 12/2001 |
| KR | 1020040074562 | 8/2004 |
| KR | 10-2005-0013760 | 2/2005 |
| KR | 1020070030459 | 3/2007 |

OTHER PUBLICATIONS

International Search Report mailed Jul. 31, 2009, for PCT/KR2008/007155.

Office action from JPO mailed Sep. 4, 2012 for JP 2011-534362.

* cited by examiner

SYSTEM, A METHOD, A SERVICE SERVER, A MOBILE TERMINAL AND A STORAGE MEANS FOR CONTENTS DELIVERY

CROSS REFERENCE TO RELATED APPLICATION

This application claims the priority of Korean Patent Application No. 10-2008-0107990, filed on Oct. 31, 2008, in the KIPO (Korean Intellectual Property Office), the disclosure of which is incorporated herein in their entirety by reference. Further, this application is the National Phase application of International Application No. PCT/KR2008/007155, filed Dec. 4, 2008, which designates the United States and was published in Korean. Each of these applications is hereby incorporated by reference in their entirety into the present application.

TECHNICAL FIELD

The present invention relates, in general, to a system and method for transmitting content, a service server, a mobile communication terminal and a storage medium, and, more particularly, to a technology that enables an end device to transmit content to a second mobile communication terminal using a first mobile communication terminal connected via a local area communication network.

BACKGROUND ART

With the development of information and communication technology, a variety of end devices capable of playing back documents, images motion pictures, etc. (hereinafter 'documents, images and moving pictures, etc.' is simply referred to as 'content' for convenience of description), such as MPEG Audio Layer 3 (MP3) players, Personal Multimedia Players (PMPs), and Ultra-Mobile Personal Computers (UMPCs), have been used. The end devices enable users to download desired content from Personal Computers (PCs) and play the downloaded content. However, the end devices have a problem in that users cannot download desired content onto the end devices when they are moving or the end devices cannot be connected with a PC.

In order to overcome this problem, there was proposed a technology for adding communication means capable of accessing LANs, such as a Bluetooth or UltraWideBand (UWB) network, to the end devices and connecting the end devices and mobile communication terminals via a local area communication network.

Meanwhile, a user may need to transmit content being played using an end device to another person's terminal. In this case, the user copies the content of the end device to a computer or downloads the content from an application server, and transmits the content to another person's computer via e-mail. Another person receives the e-mail using his or her computer, copies the content to a desired playback device and uses the content. As described above, in the case where the content of an end device is transmitted to the outside, a complicated procedure must be performed, so that the performance thereof is inconvenient.

DISCLOSURE OF INVENTION

Technical Problem

Accordingly, the present invention has been made keeping in mind the above problems occurring in the prior art, and an object of the present invention is to provide a technology capable of transmitting content being played using an end device to the outside through the message transmission of a mobile communication terminal.

Technical Solution

In order to accomplish the above objects, an embodiment of the present invention provides a system for transmitting content, including an end device connected to a first mobile communication terminal via a local area communication network, and configured to transmit content to be transmitted to a second mobile communication terminal, together with a message transmission request, to the first mobile communication terminal; and the first mobile communication terminal connected to the end device via the local area communication network, connected to a service server via a mobile communication network, and configured to display a message transmission window for inputting a message and a recipient's number on a screen when the message transmission request is received from the end device, and to transmit a Multimedia Message Service message (MMS), to which the content received from the end device is attached, to the second mobile communication terminal.

In this embodiment, the system may further include a service server connected to the first mobile communication terminal and the second mobile communication terminal via the mobile communication network, and configured to receive the content from the first mobile communication terminal and store it and to provide link information necessary for download of the content to the first mobile communication terminal, wherein, when the first mobile communication terminal receives the content, together with the message transmission request, from the end device, the first mobile communication terminal checks a size of the content, and, if the size of the content exceeds a predetermined size, transmits the content to the service server, receives the link information from the service server, and transmits the MMS message, including the link information, instead of the content, to the second mobile communication terminal.

In this embodiment, the system may further include an application server connected to the service server via a communication network, wherein the service server stores the content in the application server.

In this embodiment, the system may further include a billing server connected to the service server via the mobile communication network or a wired communication network, and configured to impose charges on the first mobile communication terminal or second mobile communication terminal when the message is transmitted to the second mobile communication terminal.

Another embodiment of the present invention provides a method of transmitting content, including the steps of a) an end device transmitting content to be transmitted to a second mobile communication terminal, together with a message transmission request, to a first mobile communication terminal; b) the first mobile communication terminal having received the message transmission request automatically loading a message transmission window for inputting a message and a recipient's number; and c) the first mobile communication terminal transmitting a message, including the content, to the second mobile communication terminal.

In this embodiment, the method may include the steps of b-1) determining whether the content received from the end device exceeds a predetermined value; b-2) if the content is determined to exceed a predetermined size at the step b-1), transmitting the content to a service server; and b-3) creating download link information related to the content received by the service server, and transmitting the download link information to the first mobile communication terminal; wherein the message transmitted at the step c) includes the download link information instead of the content.

Still another embodiment of the present invention provides a service server for transmitting content, including a communication unit for transmitting and receiving data via a mobile communication network; a storage unit for storing content received from a first mobile communication terminal; and a control unit for, when the content is received from the first mobile communication terminal, creating download link information related to the content and providing the download link information to the first mobile communication terminal.

In this embodiment, the content is transmitted by the end device via the first mobile communication terminal so as to transmit the content to a second mobile communication terminal.

Still another embodiment of the present invention provides a method of transmitting content using a service server, including the steps of receiving content from a first mobile communication terminal; creating download link information related to the content, and providing the download link information to the first mobile communication terminal; and transmitting the content corresponding to the download link information to a second mobile communication terminal.

Still another embodiment of the present invention provides a computer-readable medium storing a program for processing the method of transmitting content using a service server.

Still another embodiment of the present invention provides a mobile communication terminal for transmitting content, including a first communication unit for transmitting and receiving data over a mobile communication network; a second communication unit for transmitting and receiving data over a local area communication network; an end device management unit for managing end device information; a storage unit for storing the content and the end device information received from the end device through the second communication unit; a message creation unit for creating a message that is used to transmit the content to a second mobile communication terminal; and a control unit for controlling operation of the respective elements.

In this embodiment, the control unit, if a size of the content that will be attached to a message created by the message creation unit exceeds a predetermined size, may transmit the content to a service server through the first communication unit, and transmit content download link information provided by the service server to the message creation unit.

Still another embodiment of the present invention provides a method of transmitting content using a mobile communication terminal, including the steps of a) receiving content, which will be transmitted to a second mobile communication terminal, from an end device; b) loading a transmission window for creating a message to be transmitted to the second mobile communication terminal; c) creating a message to which the content has been attached; and d) transmitting the message to the second mobile communication terminal.

In this embodiment, the step b) includes the steps of b-1) determining whether a size of the content to be attached exceeds a predetermined size; b-2) if the content is determined to exceed a predetermined size at the step b-1), transmitting the content to a service server; and b-3) receiving download link information related to the content from the service server; and the step c) includes creating a message, including the download link information, instead of the message to which the content has been attached.

Still another embodiment of the present invention provides a computer-readable medium storing a program for processing the method of transmitting content using a mobile communication terminal.

Advantageous Effects

According to the present invention, content being played by an end device can be transmitted to a second mobile communication terminal via a first mobile communication terminal through simple manipulation, so that an end device that cannot be connected to a mobile communication network can transfer its content to another mobile communication terminal, similarly to the transmission of a message over the mobile communication network.

DESCRIPTION OF REFERENCE NUMERALS OF PRINCIPAL ELEMENTS IN THE DRAWINGS

Figure 1:
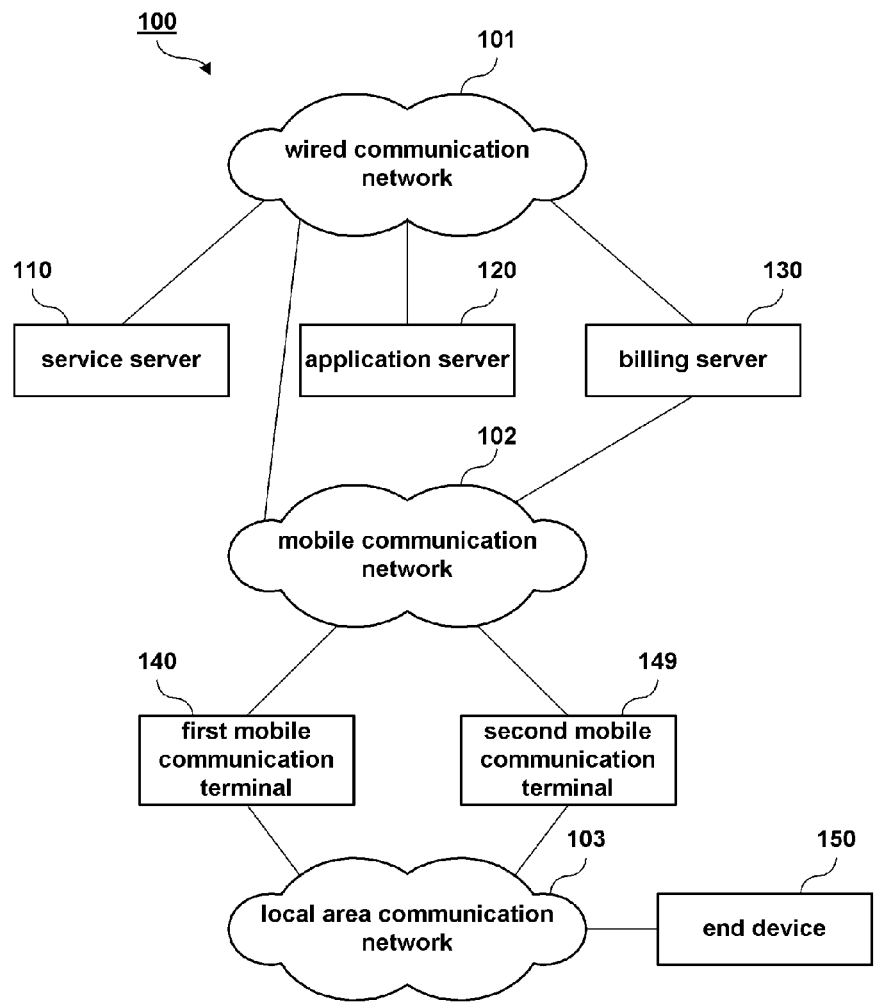
FIG. 1 is a block diagram of a system for transmitting content according to an embodiment of the present invention

100: provision system
101: wired communication network
102: mobile communication network
103: local area communication network
110: service server
120: application server
130: billing server
140: first mobile communication terminal
149: second mobile communication terminal
150: end device

MODE FOR THE INVENTION

Embodiments of the present invention will be described below with reference to the accompanying drawings.

In the following description of the present invention, if detailed descriptions of related known functions or constructions are determined to render the gist of the present invention unnecessarily vague, the detailed descriptions will be omitted. Furthermore, terms that will be described later are terms that are employed in consideration of the functions in the present invention, but the meanings thereof may be changed depending on a manufacturers intention or the usual practice. Therefore, the terms should be interpreted in light of the entire content of the specification of the present invention.

First, a system for transmitting content according to an embodiment of the present invention will be described with reference to FIGS. 1, 2 and 8.

Figure 2:
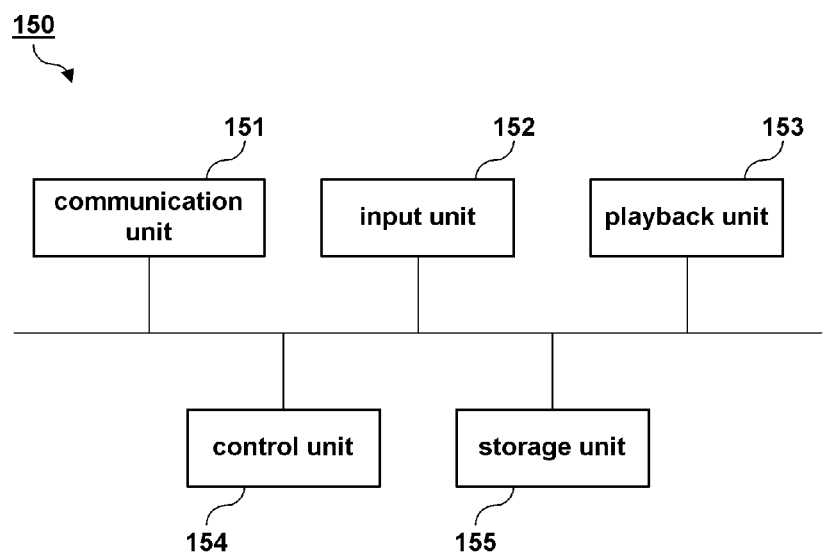
FIG. 2 is a detailed block diagram of the end device of FIG. 1
Figure 8:
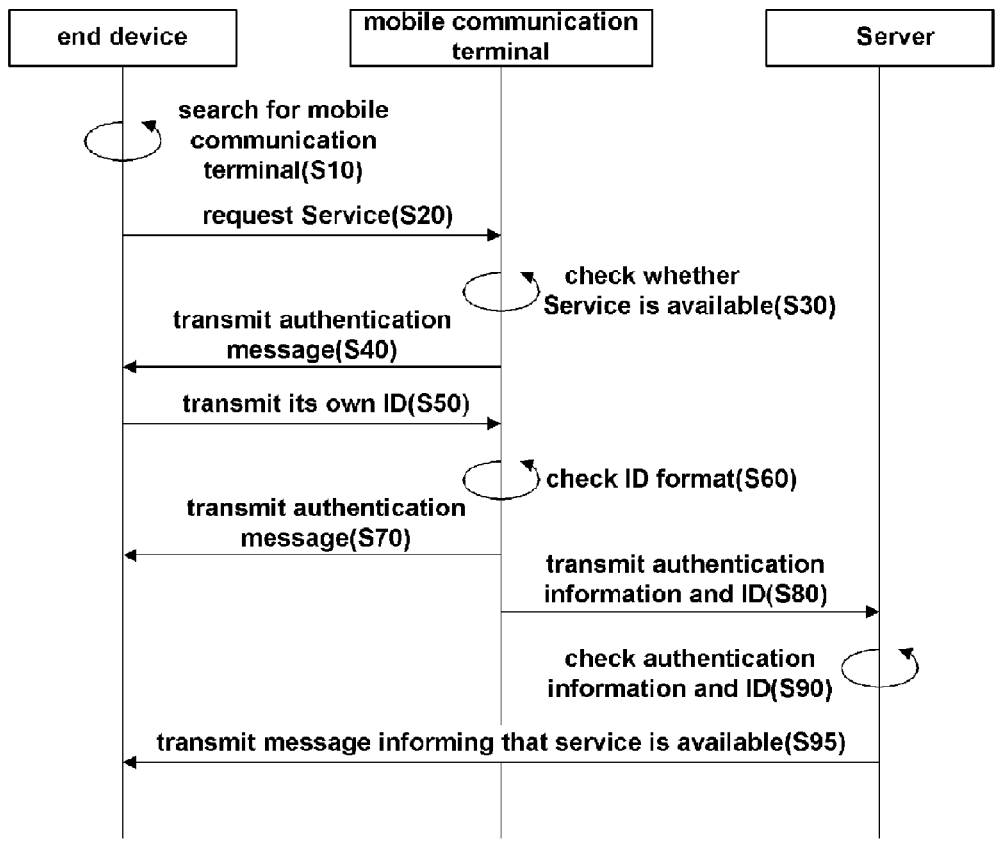
FIG. 8 is a flowchart showing the initial setting process of the present invention.

FIG. 1 is a block diagram of the system for transmitting content according to the embodiment of the present invention, FIG. 2 is a detailed block diagram of the end device of FIG. 1, and FIG. 8 is a flowchart showing the initial setting process of the present invention.

As shown in FIG. 1, the system 100 for transmitting content according to the present embodiment has a configuration in which a service server 110, an application server 120 and a billing server 130 are connected via a wired communication network 101 and/or a mobile communication network 102, a service server 110, a first mobile communication terminal 140 and a second mobile communication terminal 149 are connected via the mobile communication network 102, and the first mobile communication terminal 140 and an end device 150 are connected via a local area communication network 103. Many technologies such as Bluetooth, ZigBee and UWB, are well known as the technology for constructing a local area communication network. Furthermore, it is apparent that the functions of the application server 120 and/or the billing server 130 may be included in the service server 110.

The system 100 for transmitting content according to the present invention goes through an initial setting process shown in FIG. 8 in order to enable the recommendation of an efficient connection path.

At a first step S10, in order to use a service, the end device 150 searches for the first mobile communication terminal 140 that will function as a gateway connected to the service server 110.

At a second step S20, the end device 150 requests a service from the first mobile communication terminal 140 located at the first step. At this time, the end device also transmits account information related to the use of the service.

At a third step S30, when the first mobile communication terminal 140 receives the request for the service from the end device, the first mobile communication terminal 140 checks whether the service is available to the end device 150.

At a fourth step S40, if, as a result of the checking at the third step, the service is determined to be available to the end device 150, the first mobile communication terminal 140 transmits an authentication message indicative of the availability of the service to the end device 150. Meanwhile, if, as a result of the checking at the third step, the service is determined to be unavailable, the first mobile communication terminal 140 transmits a service-unavailable message to the end device and then terminates the process.

At a fifth step S50, the end device 150 transmits its own account information (ID).

At a sixth step S60 and S70, the first mobile communication terminal 140 checks whether the format of the account information transmitted by the end device 150 is consistent with that issued by the service server, and, if they are consistent with each other, the end device 150 transmits an authentication message indicative of the availability of the service. If they are inconsistent with each other, the first mobile communication terminal 140 transmits a service unavailable message to the end device and then terminates the process.

At a seventh step S80, the first mobile communication terminal 140 transmits its own authentication information and the authentication information of the end device 150 to the service server 110.

At an eighth step S90, the service server 110 determines the availability of the service by checking the account information.

At a ninth step S95, if the service is available to both the first mobile communication terminal 140 and the end device 150, the service server 100 notifies the end device of this fact so that the end device can use the service.

Once the above-described initial setting process has been completed, the content transmission process of the present invention is initiated. When a users command (for example, the pressing of a specific key or the selection of a menu option for directing content to be transmitted) is issued, the end device 150 transmits content to be transmitted to the second mobile communication terminal 149 to the first mobile communication terminal 140 along with a message transmission request. An MP3 player, a PMP, or a UMPC may be used as the end device 150. The end device 150 includes a communication unit for enabling connection to the local area communication network 103 and a playback unit for displaying content. The end device 150 will be described in detail with reference to FIG. 2. The communication unit 151 transmits and receives data via the local area communication network. The input unit 152 is used to input a users commands. Input means, such as a keypad, a keyboard or a touch screen, may be used as the input unit 152. The playback unit 153 plays back content. The control unit 154 controls the operation of respective elements. In particular, when a users command to transmit content is input, the control unit 154 controls the communication unit 151 so that the communication unit 151 transmits target content, which will be transmitted to the second mobile communication terminal, to the first mobile communication terminal 140. The storage unit 155 stores content to be transmitted. When a users content transmission command is input through the input unit 152, the end device 150 having the above-described construction transmits a message transmission request, together with the selected content, to the first mobile communication terminal 140.

The first mobile communication terminal 140 creates a message to which the content received from the end device 150 is attached and transmits the message to the second mobile communication terminal. This process will be described in greater detail. When the first mobile communication terminal 140 receives the content, together with the message transmission message, from the end device 140, the first mobile communication terminal 140 automatically displays a message transmission window on a screen so that the user can input a message and a recipient's number, and transmits a Multimedia Message Service (MMS) message, to which the content received from the end device is attached, to the second mobile communication terminal after the user's input has been completed. Here, if the size of the content exceeds a predetermined value, for example, a size limit for the attachment to a message, the first mobile communication terminal 140 may transmit the content to the service server 110. In this case, the service server 110 stores the content received from the first mobile communication terminal 140, and returns download link information related to the stored content to the first mobile communication terminal 140. Here, it should be noted that the service server 110 may not store the content therein but instead store the content in the application server 120.

Once the message has been transmitted to the second mobile communication terminal 149, the billing server 130 imposes charges on the first mobile communication terminal 140 and/or the second mobile communication terminal 149.

A method of transmitting content according to an embodiment of the present invention will be described with reference to FIG. 3.

Figure 3:
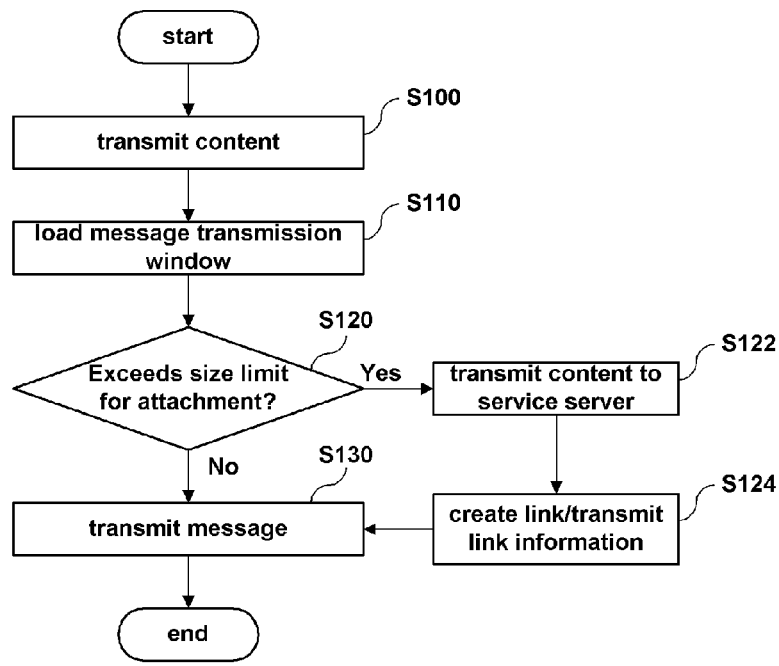
FIG. 3 is a flowchart of a method of transmitting content according to an embodiment of the present invention.

FIG. 3 is a flowchart of the method of transmitting content according to the embodiment of the present invention.

As shown in FIG. 3, the method of transmitting content according to the present embodiment is applied to a system in which the end device is connected to the first mobile communication terminal via the local area communication network, the first mobile communication terminal and the second mobile communication terminal are connected to the service server via the mobile communication network, and the service server and the application server are connected to the wired communication network.

A first step S100, when there is a user's command (for example, the pressing of a specific key or the selection of a menu option directing content to be transmitted), the end device 150 transmits content, which will be transmitted to the second mobile communication terminal 149, together with a message transmission request, to the first mobile communication terminal 140. Here, the transmitted content may be content having one or more of various formats such as text, images and moving pictures.

At a second step S110, when the first mobile communication terminal 140 receives the content, together with the message transmission request, from the end device 140, the first mobile communication terminal 140 automatically loads a message transmission window onto a screen. Here, the used message transmission window may be the transmission window of Multimedia Message Service (MMS) that is widely used in a mobile communication system. However, the present invention does not need to be limited thereto, it should be noted that, when download link information related to content, instead of the content, is transmitted to the second mobile communication terminal, the transmission window of Short Message Service (SMS) may be used.

At a third step S120, whether the size of the content to be transmitted by the first mobile communication terminal exceeds a predetermined value (for example, a size limit for the attachment to a message) is checked. Here, the size limit for the attachment may be limited depending on the hardware specification of the first mobile communication terminal, the size limitation of a message transmission service, or the like. In the case where the size limit is exceeded, the size limitation is overcome by additionally performing the following fourth and fifth steps.

At a fourth step S122, if, as a result of the checking at the third step, the size limit is determined to be exceeded, content is transmitted to the service server.

At a fifth step S124, the service server transmits download link information related to the received content to the first mobile communication terminal.

At a sixth step S130, the first mobile communication terminal transmits a message including download link information, instead of a message to which content is attached, or content, to the second mobile communication terminal. When necessary, simple text that the user desires to transmit to the second mobile communication terminal may be added to the message. Furthermore, it is apparent that the identification number (telephone number) of the second mobile communication terminal is included in the message.

A service server for transmitting content according to an embodiment of the present invention will be described below with reference to FIG. 4.

Figure 4:
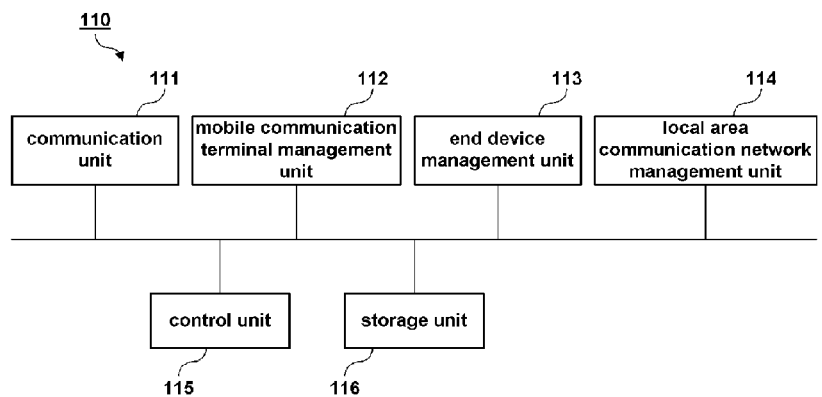
FIG. 4 is a block diagram of a service server according to an embodiment of the present invention

FIG. 4 is a block diagram of the service server according to the embodiment of the present invention.

As shown in FIG. 4, in the service server 110 for transmitting content (hereinafter 'service server for transmitting content' is simply referred to as 'service server' unless described otherwise for convenience of description) according to the present embodiment, a communication unit 111 transmits and receives data via a mobile communication network.

The mobile communication terminal management unit 112 manages information about the first mobile communication terminal and the second mobile communication terminal, which is received through the communication unit 111. The managed mobile communication terminal information includes the types and hardware specifications of mobile communication terminals, the user information of the first mobile communication terminal, and the types of charges.

The end device management unit 113 manages the information of the end device received through the communication unit 111. The managed end device information includes the type, hardware specification and unique account of the end device.

The local area communication network management unit 114 manages information about the local area communication network that relays communication between the first mobile communication terminal and the end device. The managed local area communication network information includes the specification of the communication network and a login account that is used when login is necessary.

The storage unit 116 stores the first mobile communication terminal information, the second mobile communication terminal information, the end device information, and the local area communication network information. Furthermore, the storage unit 116 may store the content received from the first mobile communication terminal.

The control unit 115 controls the operation of the respective elements. In particular, the control unit 115 performs control so that download link information related to the content received from the first mobile communication terminal can be created and can be provided to the first mobile communication terminal.

A method of transmitting content using the service server according to en embodiment of the present invention will be described with reference to FIG. 5.

Figure 5:
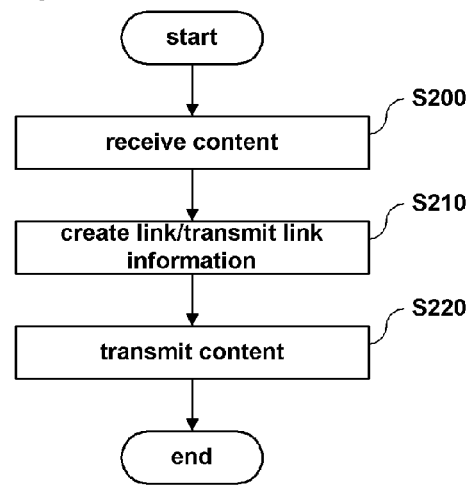
FIG. 5 is a flowchart of a method of transmitting content using a service server according to an embodiment of the present invention.

FIG. 5 is a flowchart of the method of transmitting content using the service server according to the embodiment of the present invention.

As shown in FIG. 5, in the method of transmitting content to the service server according to the embodiment, at a first step S200, content to be transmitted to the second mobile communication terminal is received from the first mobile communication terminal.

At a second step S210, download link information related to the received content is created, and this information is transmitted to the first mobile communication terminal. The download link information is information about a storage location where the content has been stored, and the content download of the second mobile communication terminal is enabled using the download link information.

At a third step S220, the content corresponding to the download link information requested by the second mobile communication terminal is transmitted to the second mobile communication terminal.

Meanwhile, a program for processing the method of transmitting content using the service server is recorded on a computer-readable medium.

The mobile communication terminal for transmitting content according to an embodiment of the present invention will be described with reference to FIG. 6.

Figure 6:
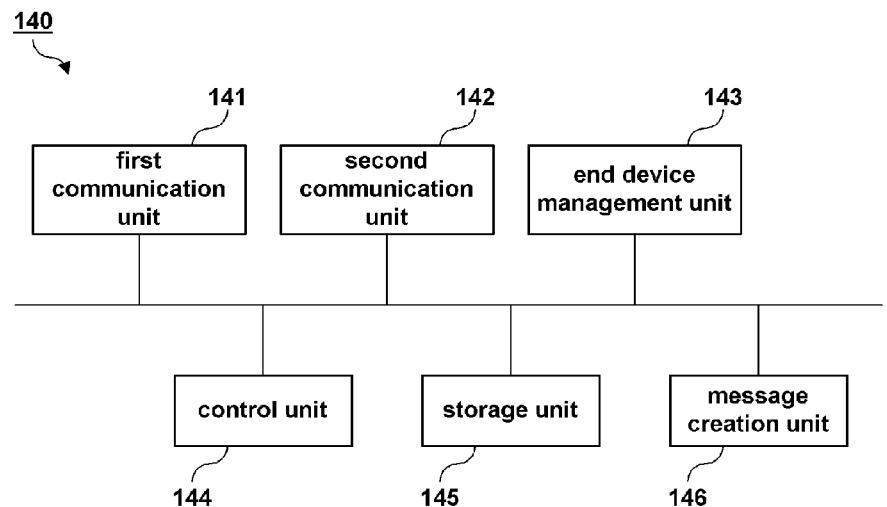
FIG. 6 is a block diagram of a mobile communication terminal according to an embodiment of the present invention.

FIG. 6 is a block diagram of the mobile communication terminal according to an embodiment of the present invention.

As shown in FIG. 6, in the mobile communication terminal 140 for transmitting content according to the present embodiment, a first communication unit 141 transmits and receives data over the mobile communication network 102.

The second communication unit 142 transmits and receives data over the local area communication network 103. To deal with the types of various local area communication network, the second communication unit 142 meets two or more local area communication network communication standards.

The end device management unit 143 manages end device information.

The storage unit 145 stores the content information and the end device information received from the end device through the second communication unit 142.

The control unit 144 controls the operation of the respective elements. The storage unit 145 stores the end device information. In the case where the content that will be included in the message created by a message creation unit exceeds a predetermined value, the control unit 144 transmits the content to the service server through the first communication unit 141 and the content download link information received from the service server is transmitted to the message creation unit 146.

The message creation unit 146 creates a message that is used to transmit the content or the content download link information to the second mobile communication terminal.

Figure 7:
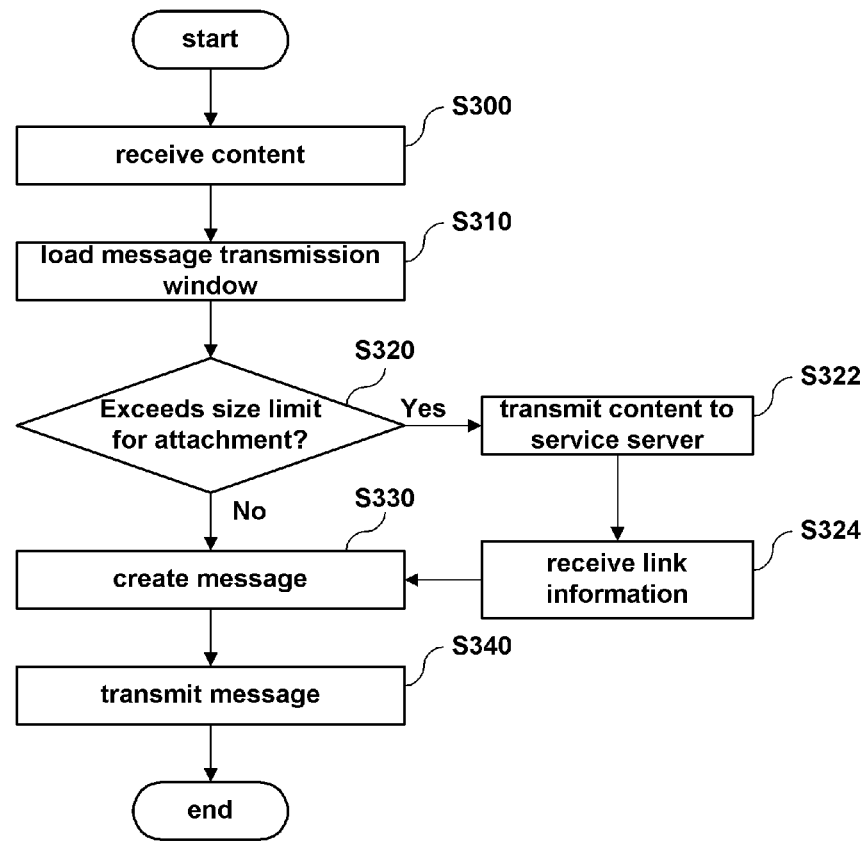
FIG. 7 is a flowchart of a method of transmitting content using the mobile communication terminal according to an embodiment of the present invention.

FIG. 7 is a flowchart of a method of transmitting content using the mobile communication terminal according to an embodiment of the present invention. The method of transmitting content using the mobile communication terminal according to the embodiment of the present invention will be described with reference to FIG. 7.

At a first step S300, content to be transmitted to the second mobile communication terminal is received from the end device.

At a second step S310, a message transmission window for transmission to the second mobile communication terminal is loaded.

At a third step S320, whether the size of the content to be attached exceeds a predetermined value is determined.

At a fourth step S322, if the size of the content is determined to exceed a predetermined value at the third step, the content is transmitted to the service server.

At a fifth step S324, download link information related to the content is received from the service server.

At a sixth step S330, a message including the content is created. It should be noted that, in the case where the above-described fourth and fifth steps have been performed, the download link information, instead of the content, is included in the message.

At a seventh step S340, the message is transmitted to the second mobile communication terminal.

Meanwhile, a program for processing the method of transmitting content to the mobile communication terminal is recorded on a computer-readable medium.

Examples of the application of the present invention will be described with reference to FIGS. 9 and 10.

Figure 9:
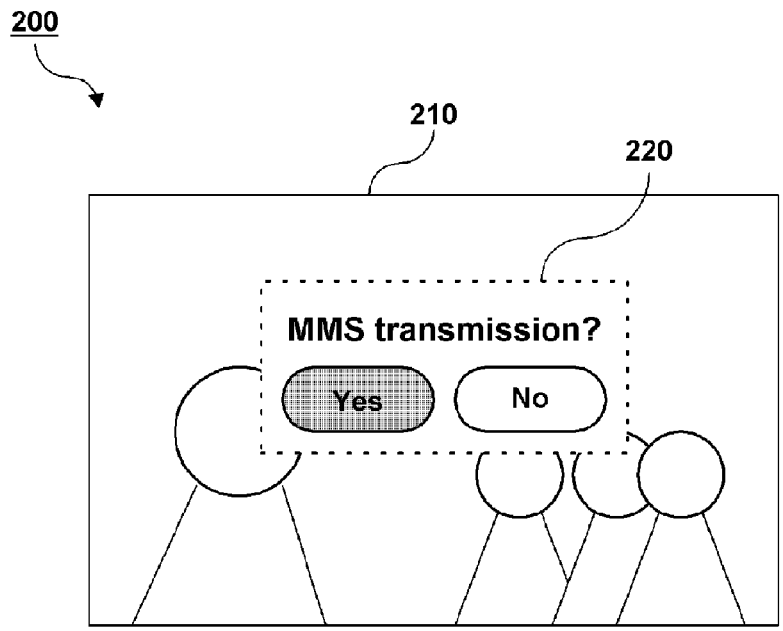
FIG. 9 shows the screen of the end device according to an example of the application of the present invention.
Figure 10:
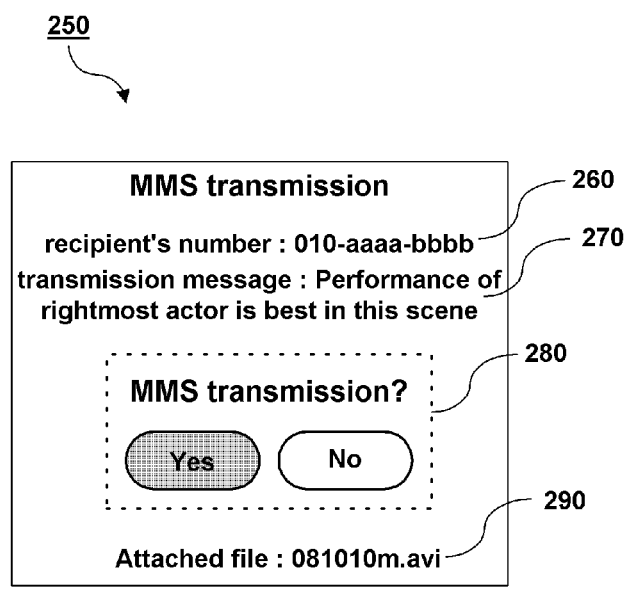
FIG. 10 shows the screen of the first mobile communication terminal according to an example of the application of the present invention.

FIG. 9 shows the screen of the end device according to an example of the application of the present invention, and FIG. 10 shows the screen of the first mobile communication terminal according to an example of the application of the present invention.

At a first step, a user views content (which is assumed to be a movie file having 200 MB in the present application example) using the end device.

At a second step, in the case where the user desires to transmit the content to the second mobile communication terminal used by another person, the end device is connected to the first mobile communication terminal through the local area communication network. Here, the first mobile communication terminal and the end device perform a connection procedure such as mutual authentication.

At a third step, the content of the end device is transmitted to the first mobile communication terminal. In this state, in the display screen 200 of the end device, an MMS transmission checking window 220 is additionally displayed on a content screen 210 being played through the manipulation of a manipulation button. The state at this time is shown in FIG. 9.

At a fourth step, the first mobile communication terminal loads a message transmission window that is used to transmit content to the second mobile communication terminal. The number of the second mobile communication terminal 260 that will receive a MMS message, text 270 to be input, and the name 290 of an attached file are displayed on the display screen 250 of the first mobile communication terminal, and the transmission checking window 280 is popped up through the manipulation of the manipulation button after required content has been input. The state at this time is shown in FIG. 10.

At a fifth step, the first mobile communication terminal checks the size of the content. In the present application example, the size of the content that can be attached through the message transmission window is assumed to have a size limit of 100 MB.

At a sixth step, since the size of the content exceeds a size limit for attachment, the first mobile communication terminal transmits the content to the service server.

At a seventh step, the service server stores the content, creates download link information, and returns the download link information to the first mobile communication terminal.

At an eighth step, the first mobile communication terminal includes the download link information in a message, and transmits the message to the second mobile communication terminal.

Through the above process, the user can transmit the content of the end device to a desired mobile communication terminal only through simple manipulation.

Hitherto the embodiments of the present invention have been described with reference to the accompanying drawings.

However, it should be noted that the present invention is not limited only to the above-described specific embodiments and various modifications and changes can be made by those skilled in the art within the scope and spirit of the attached claims as needed.

INDUSTRIAL APPLICABILITY

As described above, when the system and method for transmitting content and the service server, the mobile communication terminal and the end device therefor according to the present invention are used, the end device can transmit its own content to the second mobile communication terminal that is not connected to the end device in an environment in which a mobile communication network and a local area communication network are connected to each other, so that the present invention can be used as a new business model capable of providing a service for providing various types of content over a communication network, with the result that it is considered that the present invention has industrial applicability.

The invention claimed is:

1. A system for transmitting content, comprising:
an end device
    connected to a first mobile communication terminal via a local area communication network, and
    configured to transmit content and a message transmission request to the first mobile communication terminal;
the first mobile communication terminal
    connected to the end device via the local area communication network,
    connected to a service server via a mobile communication network, and
    configured to
        display a message transmission window for inputting a message and a recipient's number on a screen of the first mobile communication terminal when the message transmission request is received from the end device, and
        transmit a Multimedia Message Service (MMS) message which includes the inputted message and the content received from the end device is attached, to a second mobile communication terminal corresponding to the received recipient's number; and
the service server connected to the first mobile communication terminal and the second mobile communication terminal via the mobile communication network, and configured to
    receive the content from the first mobile communication terminal,
    store the received content, and
    provide download link information of stored content to the first mobile communication terminal,
wherein the first mobile communication terminal is further configured to check a size of the content when the first mobile communication terminal receives the content and the message transmission request from the end device,
wherein the first mobile communication terminal is further configured to, if the size of the content exceeds a predetermined size, transmit the content to the service server, receive the download link information of the content from the service server, and transmit the MMS message which includes the received download link information, without including the content, to the second mobile communication terminal, and
wherein the first mobile communication terminal is configured to, if the size of the content does not exceed the predetermined size, transmit the MMS message which includes the content to the second mobile communication terminal.

2. The system according to claim 1, further comprising
an application server connected to the service server via a communication network, and
wherein the service server is further configured to store the content in the application server.

3. The system according to claim 1, further comprising
a billing server
    connected to the service server via at least one of the mobile communication network or a wired communication network, and
    configured to impose one or more charges on at least one of the first mobile communication terminal or second mobile communication terminal when the MMS message is transmitted to the second mobile communication terminal.

4. A mobile communication terminal for transmitting content, comprising:
    a first communication unit configured to transmit and receive data via a mobile communication network;
    a second communication unit configured to transmit and receive data via a local area communication network;
    an end device management unit configured to manage end device information;
    a storage unit configured to store the content and the end device information, which are received from an end device through the second communication unit;
    a message creation unit configured to create a Multimedia Message Service (MMS) message which includes an inputted message and the content received from the end device; and
    a control unit configured to control operation of the respective elements and transmit the MMS message to a second mobile communication terminal corresponding to a received recipient's number,
    wherein the control unit is further configured to check a size of the content,
    wherein the control unit is further configured to, if the size of the content exceeds a predetermined size, transmit the content to a service server through the first communication unit, receive download link information of the content from the service server through the first communication unit, and transmit the download link information to the message creation unit,
    wherein the message creation unit is further configured to, if the download link information is transmitted from the control unit, create the MMS message which includes the download link information without including the content, and
    wherein the control unit is further configured to, if the size of the content does not exceed the predetermined size, transmit the MMS message which includes the content to the second mobile communication terminal.

5. A method of transmitting content, the method performed by a system for transmitting content and comprising the steps of:
    a) transmitting, by an end device, content and a message transmission request to a first mobile communication terminal;
    b) automatically loading, by the first mobile communication terminal, a message transmission window for inputting a message and a recipient's number when the first mobile communication terminal received the message transmission request from the end device; and
    c) transmitting, by the first mobile communication terminal, a Multimedia Message Service (MMS) message which includes the inputted message and the content received from the end device, to a second mobile communication terminal,
    wherein the step b) comprises the steps of:
        b-1) determining, by the first mobile communication terminal, whether the content received from the end device exceeds a predetermined size;
        b-2) if the received content is determined to exceed the predetermined size at the step b-1), transmitting, by the first mobile communication terminal, the content to a service server; and
        b-3) creating, by the service server, download link information of the content received by the service server, and transmitting, by the service server, the download link information to the first mobile communication terminal; and wherein the MMS message transmitted at the step c) includes the download link information without including the content.

6. A method of transmitting content using a mobile communication terminal, comprising the steps of:
   a) receiving content, which will be transmitted to a second mobile communication terminal, from an end device;
   b) loading a transmission window for inputting a message and a recipient's number;
   c) creating a Multimedia Message Service (MMS) message which includes the inputted message and the content received from the end device; and
   d) transmitting the MMS message to the second mobile communication terminal corresponding to the received recipient's number,
   wherein:
   the step b) comprises the steps of:
      b-1) determining whether a size of the content exceeds a predetermined size;
      b-2) if the content is determined to exceed the predetermined size at the step b-1), transmitting the content to a service server; and
      b-3) receiving download link information of the content from the service server; and
   the step c) comprises creating the MMS message which includes the download link information without including the content.

7. A non-transitory computer-readable medium storing a program for processing the method of transmitting content using a mobile communication terminal according to claim 6.

* * * * *